June 26, 1956 G. STOLL ET AL 2,751,944
MILLING MACHINE
Filed April 20, 1954 3 Sheets-Sheet 1
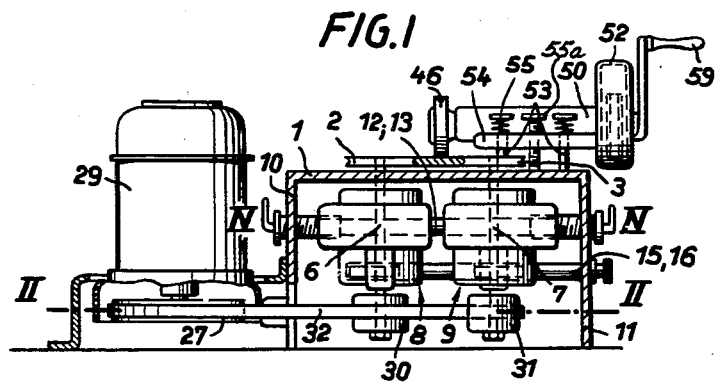
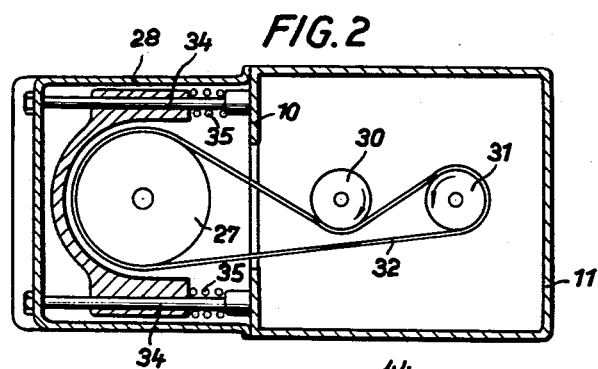
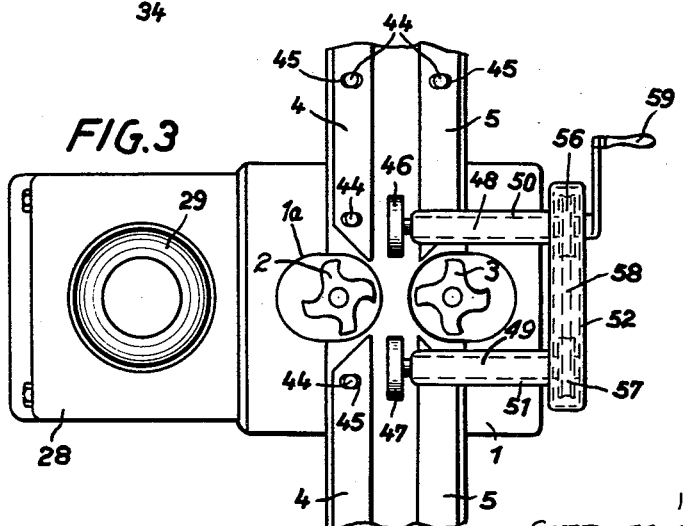
INVENTORS:
GOTTLIEB STOLL AND
GEORG SCHRAG
BY:

June 26, 1956    G. STOLL ET AL    2,751,944
MILLING MACHINE
Filed April 20, 1954    3 Sheets-Sheet 2
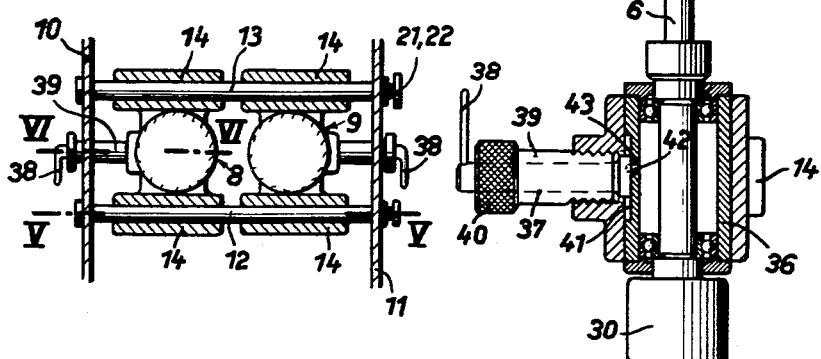
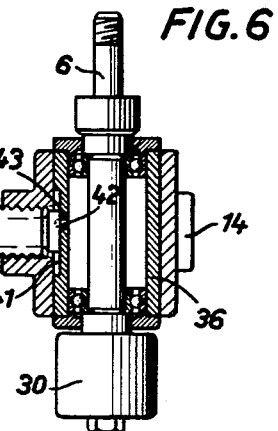
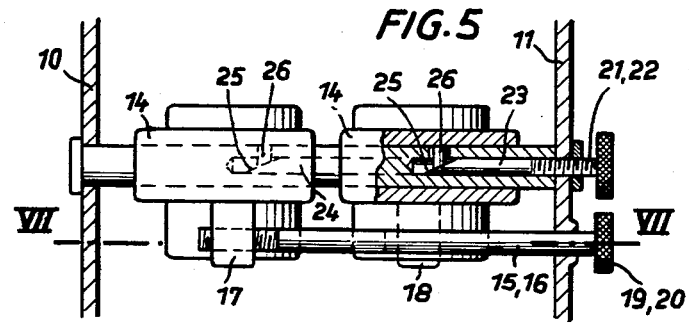
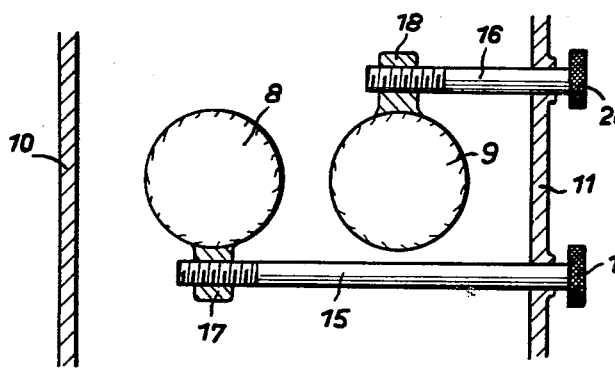
INVENTORS:
GOTTLIEB STOLL AND
GEORG SCHRAG
BY:

INVENTORS:
GOTTLIEB STOLL AND
GEORG SCHRAG
BY:

United States Patent Office 2,751,944
Patented June 26, 1956

2,751,944

MILLING MACHINE

Gottlieb Stoll and Georg Schrag, Esslingen (Neckar), Germany, assignors to Festo-Maschinenfabrik Gottlieb Stoll, Esslingen (Neckar), Germany Application April 20, 1954, Serial No. 424,432

Claims priority, application Germany April 24, 1953

6 Claims. (Cl. 144—134)

The present invention relates to a machine for milling or shaping profiles simultaneously on two opposite sides of wooden strips, ledges, or boards.

Prior to this invention, such work was usually carried out by large machines provided with automatic feeding means, which were far too expensive for smaller work shops and, if purchased for such shop, were uneconomical in use as they could hardly ever be utilized to their full extent.

It is the object of the present invention to devise a simple machine which is economical in its use even in a smaller work shop and is able to produce an output of work which is neither inferior in quality nor smaller in quantity than that of the prior large automatic machines.

A feature of the invention consists in providing a milling or shaping machine having a work table below the top of which the bearing units of two cutter spindles are mounted which extend through the work table and above the upper surface thereof, and in providing a mechanism below such table top for adjusting these bearing units relative to each other in a direction transverse to the direction of feeding of the workpieces, and in combining the two cutter spindles by a common driving mechanism which is mounted on a support remote from the operator's stand and where the work is being carried out. For operating the two cutter spindles, the invention preferably utilizes a belt drive with an automatic tensioning mechanism in which the driving belt coils around a pulley on the drive shaft as well as a pair of pulleys on the cutter spindles and below the bearing units in such a manner that the two spindles will run in opposite directions.

Another important feature of the invention resides in the fact that the work table together with the driving mechanism is easily transportable, that it may be quickly set up in any place, and does not require any special foundation. For driving the machine, it is preferable to use an electric motor which is mounted on a flanged-on support and carries the drive pulley within such support.

Another feature of the invention is the provision of a simple automatic belt tightener without special tightening pulleys and comprising a resilient mounting of the motor on the flanged-on support so as to be adjustable against spring pressure transversally to the work feeding direction. The machine may, however, also be designed to be driven by any other separate driving mechanism, in which case the drive shaft mounted on the flanged-on support is preferably provided with a clutch.

Further objects, features, and advantages of the invention will appear from the following detailed description thereof and the accompanying drawings, in which—

Fig. 1 shows a cross section of the new machine taken in a direction transverse to the direction of feeding;

Fig. 2 shows a section taken along line II—II of Fig. 1;

Fig. 3 is a top view of the machine;

Fig. 4 is a section taken along line IV—IV of Fig. 1;

Fig. 5 is a section taken along line V—V of Fig. 4;

Fig. 6 is a section taken along line VI—VI of Fig. 4;

Fig. 7 is a section taken along line VII—VII of Fig. 5;

Figure 8:
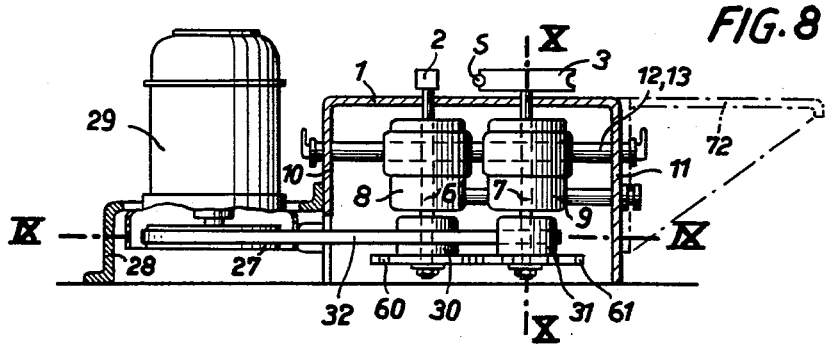
Fig. 8 is a section through a modified feeding mechanism.

Referring to Figs. 1 to 7 of the drawings, the strips or boards to be shaped along their two longitudinal sides are placed on a work table 1 to be worked on by the two cutters 2 and 3 which are rotating above the table surface at both sides of the guide rails 4 and 5. The two cutter spindles 6 and 7 which extend through the table top 1 through suitable apertures 1a are mounted in bearing units 8 and 9 which are adjustable below the table top intermediate the walls 10 and 11 (front and rear) of the table on cylindrical rods 12 and 13 in a direction transverse to the feeding direction as shown especially in Fig. 4. For this purpose the bearing units 8 and 9 are provided with transverse bushings 14 adjacent and at both sides of the main bearings and freely slidable on the cylindrical rods 12 and 13. For shifting the two bearing units 8 and 9, screw spindles 15 and 16 are rotatably mounted in the front wall 11 below the rods 12 and 13 and are threaded in brackets 17 and 18 on the units 8 and 9, as shown in Fig. 7. The outer ends of the spindles 15 and 16 carry knurled handles 19 and 20, the longer spindle 15 with the handle 19 being used for adjusting the bearing unit 8, and the shorter spindle 16 with the handle 20 for adjusting the bearing unit 9. The two units 8 and 9 may thus be adjusted separately in a direction transverse to the direction of feed of the workpiece. For locking the two units 8 and 9 in the adjusted position, see Fig. 5, the cylindrical rods 12 and 13 are provided on the operator's side with axial bores in which set screws 21 and 22 are threaded which act upon pins 23 and 24, respectively, which are slidably mounted within the bores and have wedge-like surfaces 25 at their inner ends. When the pins 23 and 24 are shifted axially, these wedge surfaces 25 act upon corresponding pressure elements 26 which are slidable in radial bores of the rods 12 and 13. By tightening the set screws 21 and 22, the elements 26 may thus be forced against the wall of the bearings 14 so as to lock the units 8 and 9 to the rods 12 and 13, respectively.

For driving the two cutter spindles 6 and 7 a pulley 27 is provided in the support 28 which is mounted on the rear wall 10 of the work table 11, opposite to, and most remote from the operator's place. In this embodiment of the invention, as shown especially in Fig. 2, pulley 27 is mounted on the shaft of an electric motor 29. However, any other suitable driving mechanism already existing may be substituted therefor. The lower ends of the cutter spindles 6 and 7 carry pulleys 30 and 31, with belt 32 positioned thereon so that the two cutter spindles 6 and 7 rotate in opposite directions. Since the bearing units 8 and 9 are made adjustable, the belt 32 must be provided with an automatic tightening mechanism. In this particular embodiment of the invention the motor 29 on the flanged-on support 28 is for this purpose mounted on rods 34 so as to be slidable transversally to the direction of feed and against the action of springs 35 which tend to force the motor 29 toward the rear, i. e. toward the left as viewed in Fig. 2, to tighten the belt 32.

The cutter spindles 6 and 7 are preferably made adjustable in their axial direction so as to permit the cutters to be set higher or lower with respect to the table top 1. For this purpose, as shown in Fig. 6, the cutter spindles are supported in special bearing bushings 36 which are mounted in the bearing units 8 and 9 and are slidable relative thereto. For shifting the bushings 36 each of the two units 8 and 9 has rotatably mounted therein a short shaft 37 extending transversally to the cutter spindle and having a handle 38 at its outer end. Shaft 37 is rotatably mounted in a bushing 39 provided with a knurled handle 40 and screwed into the housing of the main bearing. At the inner end, shaft 37 abuts against a flat portion 41 of the bushing 36. An eccentric pin 42 on the face of such inner end engages with a transverse groove 43 of the bushing 36 and, when spindle 37 is being turned, causes the bushing 36 to be raised or lowered in the bearing housing 8 or 9, respectively. After such adjustment of bushing 36, and thus of the cutter spindles 6 or 7, has been made, it may be locked in position by tightening the bushing 39 by the knurled handle 40. Since the pulleys 30 and 31 are made of sufficient width to permit the belt to slide thereon in the axial direction, the axial adjustment of the cutter spindles 6 and 7 does not interfere with the proper operation of the belt.

The feed track for the workpieces is, as already mentioned, limited by guide rails 4 and 5 which are secured to the table surface 1 by screws 44. The distance between the rails may be adjusted in accordance with the width of the workpiece, for which purpose the screw holes 45 are elongated.

For feeding the workpieces along the feed track between the guide rails 4 and 5, a feeding mechanism is provided which consists of two elastic feed rollers 46 and 47 which may, for example, be equipped with a rubber tread, and the parallel shafts 48 and 49 of which are mounted in bearings 50 and 51 of a gear housing 52. The two bearings 50 and 51 are mounted at a sufficient distance from each other to accommodate a cutter or shaper between them, the feed roller 46 therefore being provided above the feed track in front of the pair of cutters and feed roller 47 behind the cutters. The entire feeding mechanism is placed on the table surface 1 as a unit, and its position thereon is fixed by vertical stay bolts 53 secured to the table 1 and passing through lateral projections 54 of the bearings 50 and 51. Springs 55 surrounding the bolts 53 press the feeding mechanism upon the table surface 1 so as to be resilient in upward direction. The tension of springs 55 therefore determines the force with which the feed rollers 46 and 47 act upon the workpiece. In addition, an adjusting screw 55a is provided on each side of the bearings 50, 51 for adjusting the height of the feeding mechanism above the work table 1. The shafts 48 and 49 of the feed rollers 46 and 47 carry gears or wheels 56 and 57 in the gear housing 52 which are connected by a chain or a belt 58 so as to rotate in the same direction. Shaft 48 is extended through the gear housing 52 and carries on its end a crank 59 for rotating the two feed rollers. In place of the crank, however, an electric motor may be provided for driving the feed rollers 46 and 47. In such event, the motor may be mounted on the gear housing 52 to drive one of the shafts of the feed rollers through a suitable gear transmission, such as a worm gear.

Figure 9:
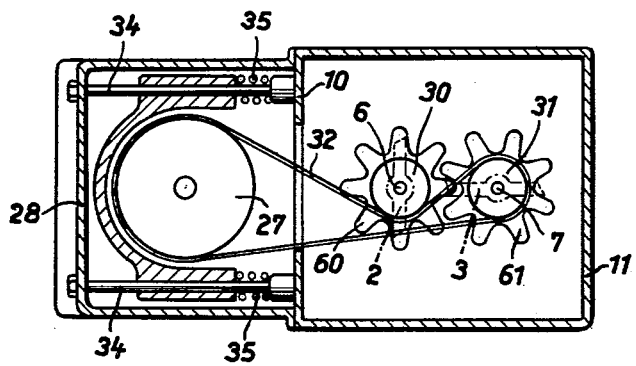
Fig. 9 is a section taken along line IX—IX of Fig. 8.
Figure 10:
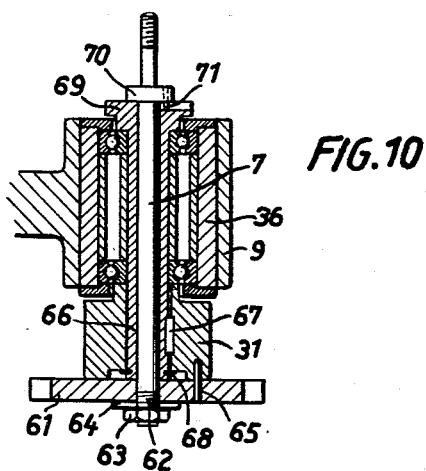
Fig. 10 is a section taken along line X—X of Fig. 8.

In the modification of the invention shown in Figs. 8 to 10, in addition to their common belt drive 32, the two cutter spindles 6 and 7 are also connected by a pair of interengaging gears 60, 61, the teeth of which are shaped so as to insure that the two gears will remain in engagement if the axial distance between the cutter spindles is changed. Since otherwise this embodiment of the invention does not differ to any considerable extent from that shown in Figs. 1 to 7, the same reference numerals are applied to both embodiments. The pair of gears 60, 61 prevents the two cutter spindles from slipping relative to each other when driven by the belt 32. This is of importance especially when shaping round or angular rods or strips of wood in which the two profiles are supposed to merge completely with each other. When shaping such rods or strips, the cutting circles described by the two cutters 2 and 3 must slightly intersect or overlap each other so as to avoid a ridge or burr on the workpiece. If the cutter spindles are able to slip relative to each other when driven by the belt, it is unavoidable that sooner or later the cutting edges of the two cutters will hit each other, even though at the beginning they may be properly turned so as not to interfere with each other. The positive connection of the two cutter spindles maintains their predetermined setting at all times so that their cutting edges can never meet.

The positive connection of the two cutting spindles is, however, also of advantage if the cutting circles described by the cutters do not overlap or intersect. The cutters are then preferably mounted on the spindles so that their cutting edges start to act on both sides of the wood simultaneously. This improves the cutting action considerably and prevents the individual cutting edges from knifing into the ends of the wood which otherwise occurs very easily.

The pair of gears 60, 61 does not increase the load upon the machine to any material extent since its only function is to balance the difference caused by the belt 32 slipping differently on the pulleys 30 and 31. Such small load, therefore, does not cause any appreciable change in the cutting action. For this reason, the gears may also be made of non-metallic material, such as a molded plastic, to obtain an even and more noiseless operation thereof.

In the embodiment of the invention shown in Figs. 8 to 10 the two gears 60 and 61 are mounted below the pulleys 30 and 31 on the free ends of the cutter spindles 6 and 7, respectively. The teeth of these gears are made relatively wide so as to remain in engagement even if the axial distance should change considerably by a relative adjustment of the bearing units 8 and 9 of the cutter spindles 6 and 7.

As shown in Fig. 10, the interengaging gears 60 and 61, which preferably consist of molded plastic, with fabric inserts, if desired, are mounted at the lower end of the pulleys 30 and 31, respectively. For this purpose, the free end of each of the cutter spindles 6 and 7 is provided with screw threads 62 on which a nut 63 is screwed which, with a washer 64 interposed, presses the gear 60 or 61 against the lower side of the pulleys 30 and 31. Each of the gears is positively connected to the respective pulley 30 and 31. Each of the gears is positively connected to the respective pulley 30 or 31 by a coupling pin 65 which fits tightly into a bore in the pulley and slidably into a bore in the gear, so that the gear 60 or 61 can be easily removed therefrom when the nut 63 is unscrewed.

Fig. 9 illustrates in dot-and-dash lines two-edged cutters 2 and 3 which are mounted on the cutter spindles 6 and 7 so as to be turned 90° relative to each other. The two cutters are unable to hit each other even if the cutting circles described by them should intersect, for example, when milling a round rod S, as shown in Fig. 8. The two interengaging gears 60 and 61, by positively connecting the two cutter spindles 6 and 7 and not permitting them to slip relative to each other when driven by the belt 32, insure that the cutter position once adjusted always remains the same. The upper free end of the cutter spindles 6 and 7 is preferably shaped so as to permit each cutter to be mounted in either of two positions which are turned 90° relative to each other. The cutters may then also easily be mounted so that their cutting edges act on the workpiece simultaneously if the cutting circles described by the two cutters do not intersect. Also in this case, the positive connection of the two cutter spindles ensures that the relative position of the cutters always remains the same and an even, smooth cut is obtained at all times.

Fig. 10 illustrates a modification of the embodiment shown in Fig. 6 insofar as the bearing of the cutter spindle in the bearing unit is concerned; a modification which is applicable particularly to the outer spindle 7, i. e. the spindle closest to the operator's stand. In this case, the cutter spindle 7 is enclosed by a bushing 66 which is rotatable in the bearing unit 9 or, more specifically, in the bushing 36 which is axially slidable in unit 9, and also carries the pulley 31 secured thereto by a wedge 67 and prevented from axial movement by a spring ring 68. The bushing 66 is fixedly secured in axial direction between the pulley 31 and a collar 69 provided at its upper end. The spindle is inserted into the bushing 66 from above, as viewed in Fig. 10, and has at its upper end a collar 70 which is connected to the collar 69 of the bushing 66 by a coupling pin 71 which may, for example, be fixedly secured in the collar 70 of the spindle 7 and be slidable in the collar 69 of the bushing 66. If the nut 63 is loosened, spindle 7 may be pulled upwardly without requiring the pulley 31 to be removed. Thus, spindle 7 may be easily removed and the machine be used as a one-spindle table shaping or milling machine.

If so used as a one-spindle machine, larger work-pieces may also be worked thereon. If for such purpose the regular work table should be too small, an extension 72 may be provided, as shown in dot-and-dash lines in Fig. 8 which may be removably mounted on the front side of the machine. The aperture in the table top 1 for the front cutter spindle 7 may then be covered by a suitable insert. If desired, the extension table 72 may also be designed so as to cover such aperture. In the event that the work-pieces are to be fed by a feeding mechanism, such as shown in Figs. 1 and 3, and the extension table 72 be required, such feeding mechanism should, however, not then be mounted at the front side of the machine but at the opposite side and be provided with a motor drive.

While the foregoing description sets forth in detail what we regard as the preferred embodiments of our invention, it is to be understood that numerous changes may be made therein without departing from the spirit and scope of the invention as defined in the appended claims.

Having thus described our invention, what we claim as new is:

1. A machine for shaping profiles simultaneously on opposite sides of wooden strips comprising a work table having a top, a pair of cutter spindles extending through said top, bearing units below said top for rotatably mounting said spindles, each of said units comprising a housing, a bushing rotatably supporting one of said spindles and slidable in axial direction of said spindle within said housing, a shaft rotatably mounted in said housing transversally to said bushing, eccentric means on said shaft engaging said bushing, means for turning said shaft for adjusting the position of said bushing and the spindle therein in axial direction thereof, and means for locking said shaft in adjusted position, driving means, and transmission means connected to said spindles for relative movement in the axial direction of said spindles, said transmission means connecting said driving means with said spindles for rotating said spindles in opposite directions.

2. A machine for shaping profiles simultaneously on opposite sides of wooden strips comprising a work table having a top and front and rear sides, a pair of cutter spindles extending through said top, bearing units for rotatably mounting said spindles, a pair of shafts mounted in said front and rear sides of said work table on either side of said bearing units, means for mounting said bearing units on said shafts so as to be movable in the axial direction thereon, driving means, and transmission means connected to said spindles for relative movement in the axial direction of said spindles, said transmission means connecting said driving means with said spindles for rotating said spindles in opposite directions.

3. A machine for shaping profiles simultaneously on opposite sides of wooden strips comprising a work table having a top, and front and rear sides, a pair of cutter spindles extending through said top, bearing units for rotatably mounting said spindles, a pair of cylindrical shafts mounted in said front and rear sides of said work table on either side of said bearing units, a pair of bushings on each of said bearing units and axially slidable on said shafts, means for adjusting said units relative to each other on said shafts, each of said shafts having an axial bore therein, and one bushing of each of said units having a radial bore connected with said axial bore, a pin having an inclined inner end axially slidable within said axial bore, a short pin within said radial bore having an inclined inner end resting on the inclined end of said first pin, and a screw threaded in the front side of said table and when tightened adapted to slide said axial pin inwardly of said bore so as to press the outer end of said radial pin against the inner wall of said bushing to lock said entire bearing unit against axial movement on said shafts, driving means, and transmission means connected to said spindles for relative movement in axial direction of said spindles, said transmission means connecting said driving means with said spindles for rotating said spindles in opposite directions.

4. A machine for shaping profiles simultaneously on opposite sides of wooden strips comprising a work table having a top, a pair of cutter spindles extending through said top, bearing units for rotatably mounting said spindles, single driving means common for both cutter spindles, and work feeding means comprising a pair of elastic wheels, means for rotatably mounting said wheels above said table top intermediate said spindles and in front and behind the same in the direction of feeding for pressing a workpiece against said top of said table, means for adjusting said wheels in a vertical direction relative to said table top, and means for driving said wheels.

5. A machine for shaping profiles simultaneously on opposite sides of wooden strips comprising a work table having a top, a pair of cutter spindles extending through said top, bearing units for rotatably mounting said spindles, single driving means common for both cutter spindles, and work feeding means comprising a pair of wheels having an elastic rim, means for rotatably mounting said wheels above said table top intermediate said spindles and in front of and behind the same in the direction of feeding for pressing a workpiece against said top of said table, means for adjusting said wheels in a vertical direction relative to said table top, means for securing said work feeding means to said table top so as to be resilient in a vertical direction thereof, and means for driving said wheels.

6. A machine for shaping profiles simultaneously on opposite sides of wooden strips comprising a work table having a top, a pair of cutter spindles extending through said top, bearing units for rotatably mounting said spindles below said top, driving means common for both cutter spindles, a pair of opposite lateral guide rail means for guiding workpieces in a feeding direction towards and away from said cutter spindles, and work feeding means comprising a pair of parallel shafts, means for rotatably mounting said shafts above said table top intermediate said spindles and in front of and behind the same in the direction of feeding, means for removably securing said shaft mounting means to said table top so as to be resilient in a vertical direction thereof, means for adjusting said shafts in a vertical direction relative to said table top, a wheel having an elastic tread at one end of each of said shafts, driving means at the other end of one of said shafts for pressing a workpiece against said top of said table, and means connecting said shafts for rotating the same at the same speed.

References Cited in the file of this patent

UNITED STATES PATENTS

| | | |
|---|---|---|
| 13,808 | Woodbury | Nov. 13, 1855 |
| 40,269 | Lee | Oct. 13, 1863 |

(Other references on following page)

UNITED STATES PATENTS

| | | |
|---|---|---|
| 396,513 | Saucier | Jan. 22, 1889 |
| 415,631 | Garnerich | Nov. 19, 1889 |
| 433,446 | Cleveland | Aug. 5, 1890 |
| 1,176,290 | Hegeler et al. | Mar. 21, 1916 |
| 2,184,801 | McCarthy | Dec. 26, 1939 |
| 2,196,892 | Berndt | Apr. 9, 1940 |
| 2,353,202 | Tautz | July 11, 1944 |
| 2,571,861 | Gegumis | Oct. 16, 1951 |

FOREIGN PATENTS

| | | |
|---|---|---|
| 1,107 | Great Britain | of 1856 |